United States Patent [19]
Crawford et al.

[11] Patent Number: 5,132,923
[45] Date of Patent: Jul. 21, 1992

[54] SYSTEM FOR MONITORING STORAGE TANKS

[75] Inventors: Charles D. Crawford, Burlington; James A. King, Jr., Stoneville; John H. Randolph, Charlotte, all of N.C.

[73] Assignees: J.A. King & Company, Inc.; Major Oil Company, Inc., both of Greensboro, N.C.

[21] Appl. No.: 484,209

[22] Filed: Feb. 23, 1990

[51] Int. Cl.⁵ .............................................. G01E 25/00
[52] U.S. Cl. .................... 364/558; 364/571.03; 364/509; 73/309; 73/49.2
[58] Field of Search ............... 364/509, 558, 571.02, 364/751.03, 571.07; 73/309, 322.9, 40.7, 49.2 T

[56] References Cited

U.S. PATENT DOCUMENTS

| Re. 31,884 | 5/1985 | Hansel | 73/49.2 |
|---|---|---|---|
| 4,244,218 | 1/1981 | Wuhrl | 73/309 |
| 4,281,534 | 8/1981 | Hansel | 73/49.2 |
| 4,303,948 | 12/1981 | Houvig | 364/558 X |
| 4,349,882 | 9/1982 | Asmundsson et al. | 364/509 |
| 4,387,778 | 6/1983 | Wohrl | 177/207 |
| 4,471,656 | 9/1984 | Sanders et al. | 364/509 X |
| 4,589,077 | 5/1986 | Pope | 364/509 |
| 4,646,560 | 3/1987 | Maresca et al. | 73/49.2 |
| 4,852,054 | 7/1989 | Mastandrea | 364/509 |
| 4,945,756 | 8/1990 | Lewis et al. | 73/309 X |
| 4,954,973 | 9/1990 | Jacob et al. | 364/509 X |
| 4,967,592 | 11/1990 | Lagergren et al. | 73/309 T |
| 4,972,327 | 11/1990 | Kotulla | 364/509 |
| 4,977,528 | 12/1990 | Norris | 364/509 X |
| 4,981,039 | 1/1991 | Hayashi et al. | 73/292 |
| 4,986,113 | 1/1991 | Harrison et al. | 73/309 X |

OTHER PUBLICATIONS

Product Brochure, Alert Technologies, dated Nov. 11, 1989 "Smart Stik TM I".

*Primary Examiner*—Joseph L. Dixon
*Attorney, Agent, or Firm*—Rhodes, Coats & Bennett

[57] ABSTRACT

A system for monitoring a storage tank containing a fluid. The system measures the buoyancy force acting on a displacer suspended in a storage tank by means of a load cell. The resulting force acting on the displacer is proportional to the mass of fluid in the tank. A look-up table is first developed by making periodic entries of the resulting load cell output during the initial filling of the tank. This data is then stored in a computer memory. By utilizing this data and interpolating between entries, a very accurate measurement of the fluid mass in the tank is calculated. In addition, by making periodic measurements over time, small leaks can be detected. In the preferred embodiment, the monitor includes an A/D converter located adjacent to the sensor assembly, thereby substantially eliminating measurement errors due to thermoelectric effects. The sensor assembly includes a generally cylindrical displacer extending from near the tank bottom or at least below the lowest level reached by the fluid in the tank to the maximum level reached by the fluid. In one preferred embodiment, the displacer has a tapered cross-section on at least one of its ends to substantially eliminate measurement errors which occur due to changes in fluid temperature.

22 Claims, 5 Drawing Sheets

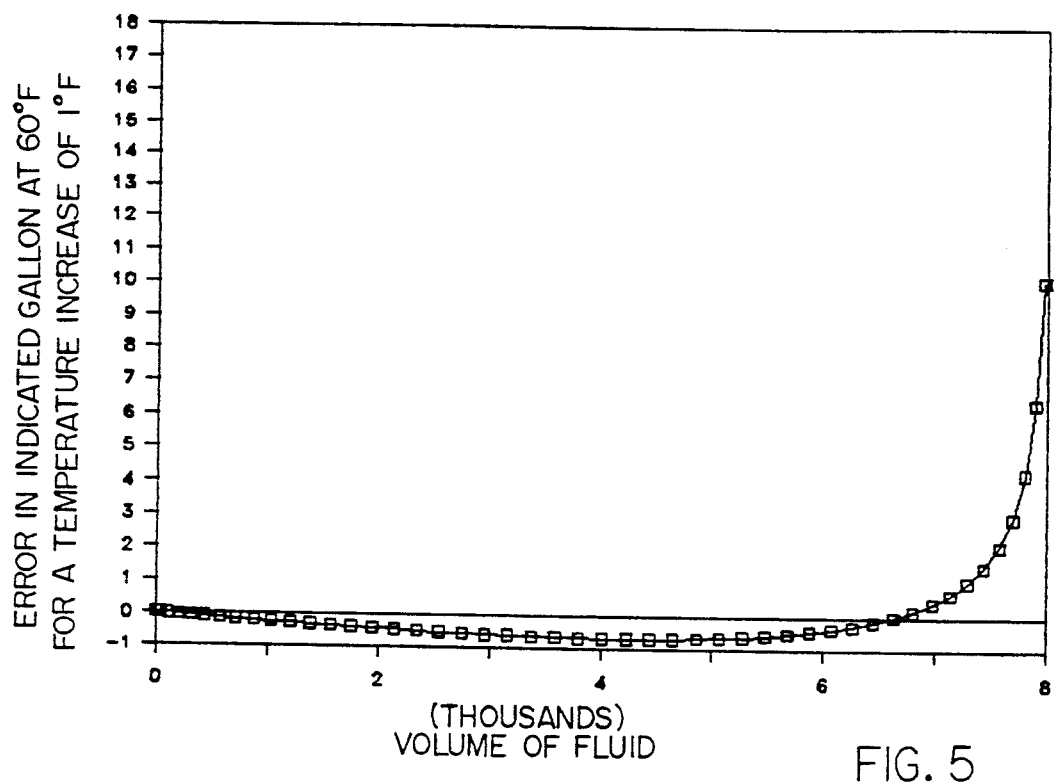
FIG. 5
FIG. 6
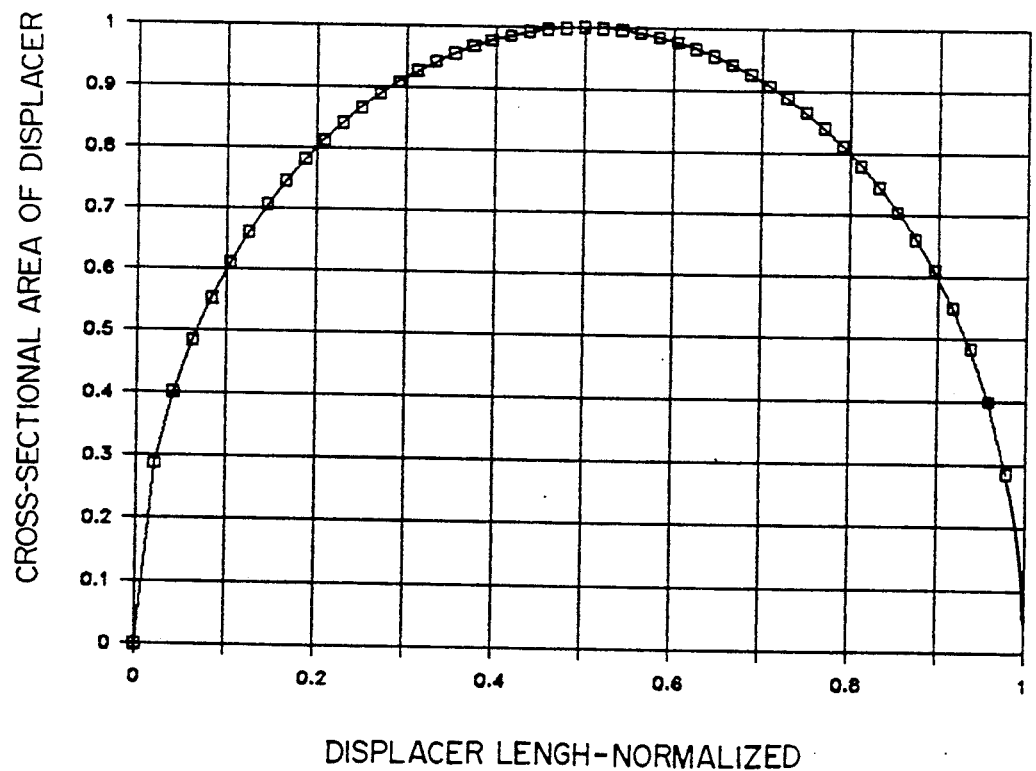

SYSTEM FOR MONITORING STORAGE TANKS

BACKGROUND OF THE INVENTION

(1) Field of the Invention

The present invention relates generally to liquid monitoring systems and, more particularly, to a system for precisely monitoring liquid in a storage tank for the detection of leaks and inventory control.

(2) Description of the Prior Art

Underground fuel storage tanks are used extensively in the service station industry. Leaks from these tanks can result in the escape of thousands of gallons of gasoline or fuel oil which may contaminate the ground water. It is estimated that there are about one million of these underground gasoline storage tanks in the United States. Approximately one-third of these tanks are 20 years old or older. Accordingly, the risk of leaks from a large number of these tanks due to corrosion or structural failure continues to increase. In addition, since the tanks are buried underneath the surface of the earth, such leaks are not easily detectable by visual inspections and inventory control data is usually inadequate for determining existence of any except large leaks.

One method now used to detect tank leaks is to plug all but one opening in tank being tested; connect a "standpipe" to the one unplugged opening; and fill the tank more than the normal maximum amount until the level of liquid in the tank rises into the "standpipe" to a height of several feet above ground level. If the liquid begins to drop in the "standpipe", it is assumed that there must be a leak in the system.

A second, similar test method is to fill the tank with liquid; plug all but one opening of the tank; and pressurize the interior of the tank with air through the one unplugged opening. The unplugged opening then is plugged and the air pressure within the tank is monitored over time. If the air pressure within the tank drops, there may be a leak in the system.

It is readily apparent that these measurement methods are fraught with problems. For example, as will be more clearly explained later, measurement of changes in tank volume are most dependent on temperature when the tank is full or nearly so. Also, tank distortion or air bubbles will cause significant errors. Furthermore, such methods are expensive since the station must be shut down during the test for considerable periods, require a trained operator, and do not continuously monitor the tank in order to provide early detection of leaks.

The current industry standard for threshold detection of leakage has been established by the Environmental Protection Agency (EPA) as 0.05 gallons per hour, regardless of tank size. Many variables, such as changes in the volume of air and liquid due to changes in temperature, make it difficult to determine conclusively the existence of such a small leak.

The temperature of the fluid in an underground tank, for example, can change continually at rates of up to 0.01 degrees F per hour. Changes of this magnitude will cause a volumetric change of up to 0.06 gallons per hour in 8,000 gallons of gasoline. Consequently, a slight change in the temperature of the contents of a tank will produce a volume change which is greater than the amount of leakage which is sought to be detected. Therefore, prior art leak detecting systems usually employ elaborate temperature measuring systems, in addition to the tank level measuring system, to allow compensation for temperature changes.

In order to eliminate or minimize the effect of the variation in volumetric change of the tank contents due to temperature changes, it has been known to measure the mass of the liquid in the storage tank by use of Archimedes' buoyancy principle. Examples of such devices are set forth in U.S. Pat. No. 4,387,778 and 4,244,218 issued to Wohrl and 4,281,534 and 4,300,388 (now Reissue 31,884) issued to Hansel et al.

Wohrl '218 noted that there was a relationship between the cross-sectional area of the displacer and the tank at any fluid level. Furthermore, Wohrl recognized that there was an advantage to specially shaping the displacer to "match" a particular storage tank in order to provide a measurement output which is a linear function of mass for that tank. Specifically, Wohrl '218 considered that the cross-sectional area of the displacer at any fluid level within the operational range of the fluid measuring device should have a constant ratio to the cross-sectional area of the tank at the same fluid level. Thus, Wohrl '218 teaches that it is only necessary to shape the displacer over the operational range of the measuring device.

An upstanding cylindrical tank is an ideal application for measuring the mass of the liquid in the storage tank by use of Archimedes' buoyancy principle since it is simple to fabricate a cylindrical displacer. However, most underground storage tanks are not upright cylinders but are laid horizontally and may have domed ends. U.S. Pat. No. 4,646,560, issued to Maresca et al., provides a particularly detailed description of the variation of total volume of a conventional underground storage tank as a function of depth for tanks of between 4,000 and 10,000 gallons. Maresca does not apply this teaching to a "force on displacer" measurement system, however, Maresca appears to appreciate that special shaping must be over the entire tank for the measurement device to be insensitive to temperature.

However, because of uncertainties in the displacer and tank geometry, the principle method of calibration, as taught by Wohrl '218 and others, is to either first fill or empty the tank and then either progressively remove or add fluid in discrete steps with a known amount of fluid while comparing this with the change in fluid level indicated by the tank monitor. However, such a procedure generally involves making a large number of calibration measurements. In addition, the tank may require recalibration if a sensor is replaced.

Thus, there remains a need for a new and improved tank monitor which is sufficiently sensitive, regardless of temperature changes, so as to detect leaks of 0.05 gallons per hour or less in underground storage tanks having a volume of from 500 hundred to 20 thousand gallons or more.

SUMMARY OF THE INVENTION

The present invention is directed to a tank monitoring system which measures the buoyancy force acting on a displacer column suspended in a storage tank by means of a load cell. The force acting on the displacer is proportional to the mass of fluid in the tank, which is temperature independent, rather than the volume of fluid in the tank which changes with temperature. Since the buoyancy force contributed by the displaced fluid at any level in the tank is proportional to the density of the fluid at that level, the technique is also intrinsically insensitive to any temperature stratification of the fluid in the tank. Thus, elaborate temperature measurement and correction functions are eliminated.

Accordingly, a look-up table is first developed by making periodic entries of the resulting load cell output during the initial filling of the tank. This data is then stored in a computer memory. By utilizing this data and interpolating between entries, a very accurate measurement of the fluid mass in the tank is calculated. In addition, by making periodic measurements over time, small leaks can be detected early.

In the preferred embodiment, the calculated fluid mass is compared with the recorded amounts from individual dispensers connected to each tank to reconcile total tank inventory.

Also, in the preferred embodiment, the tank monitor of the present invention includes an A/D converter located adjacent to the sensor assembly. The conversion of the output of the load cell to a digital signal should preferably be accomplished inside the pipe extending from one of the tank's access ports to ground level. This arrangement allows the load cell and its electronics to take advantage of the relatively constant temperature tank environment provided by the large fluid mass in the tank and the insulation benefit of the earth surrounding the tank, thereby substantially eliminating measurement errors due to thermoelectric effects which have been found to occur in analog-based systems due to differences in temperature between individual components.

The sensor assembly of the present invention includes a generally cylindrical displacer. The displacer extends from near the tank bottom to at least the maximum level reached by the fluid in the tank. In one preferred embodiment, the displacer has a tapered cross-section on each of its ends to compensate for the change in the cross-sectional area of the fluid at different heights in the tank. These arrangements substantially eliminate measurement errors which occur due to changes in the temperature of the fluid in the tank.

Accordingly, one aspect of the present invention is to provide a tank monitoring system which measures the buoyancy force acting on a displacer column suspended in a storage tank. A look-up table, developed by making periodic entries of the resulting force on the displacer during the initial filling of the tank, is utilized to calculate the fluid mass in the tank. Changes in the calculated fluid mass can be compared with the recorded amounts from individual dispensers connected to each tank to reconcile total tank inventory and to detect small leaks.

Another aspect of the present invention is to provide a tank monitor which includes an A/D converter located adjacent to the sensor assembly and maintained at substantially the same temperature as the sensor assembly, thereby substantially eliminating measurement errors which occur due to changes in temperature.

Still another aspect of the present invention is to provide a sensor assembly which includes a generally cylindrical displacer which extends substantially the full depth of the underground tank and, in the preferred embodiment, has a tapered cross-section on each of its ends to compensate for the change in the cross-sectional area of the fluid at different heights in the tank, thereby eliminating measurement errors which would otherwise occur due to changes in temperature of the fluid in the tank.

These and other aspects of the present invention will be more clearly understood after review of the following description of the preferred embodiment of the invention when considered with the drawings.

BRIEF DESCRIPTION OF THE DRAWINGS

FIG. 5 is a graphical representation of the temperature induced error of a tank monitor using a cylindrical displacer for a one degree F change;

FIG. 6 is a graphical representation of the relationship between displacer and tank geometry for a horizontally laid, cylindrical cross-section tank;

DESCRIPTION OF THE PREFERRED EMBODIMENTS

Figure 1:
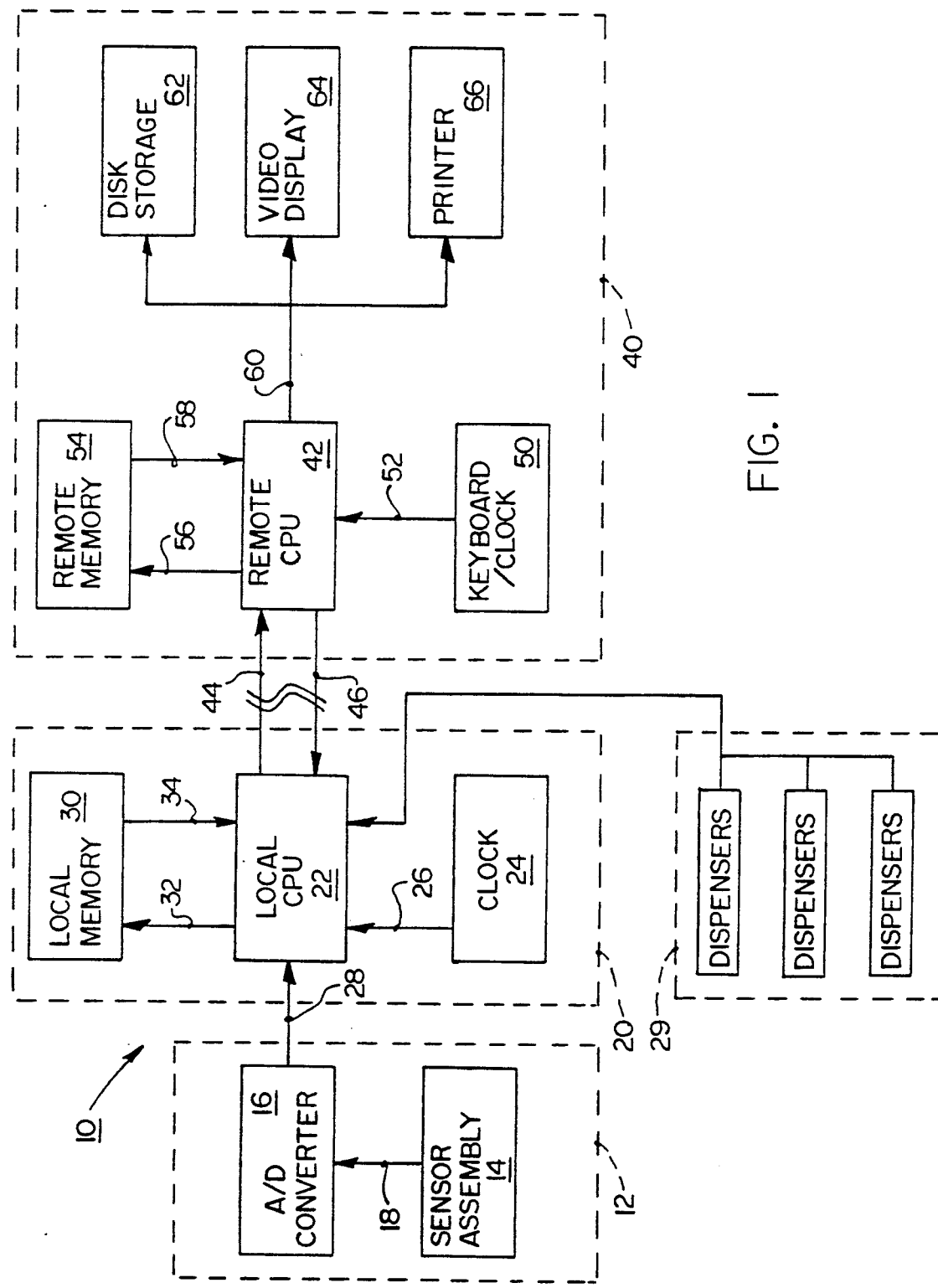
FIG. 1 is a block diagram illustrating a tank monitor and inventory control system constructed according to the present invention.

Referring now to the drawings in general and FIG. 1 in particular, it will be understood that the illustrations are for the purpose of describing a preferred embodiment of the invention and are not intended to limit the invention thereto. As best seen in FIG. 1, a tank monitor and inventory control system, generally designated 10, is shown constructed according to the present invention. The tank monitor and inventory control system 10 includes three major sub-assemblies: a tank monitor 12; a local polling system 20; and a remote polling system 40.

Figure 2:
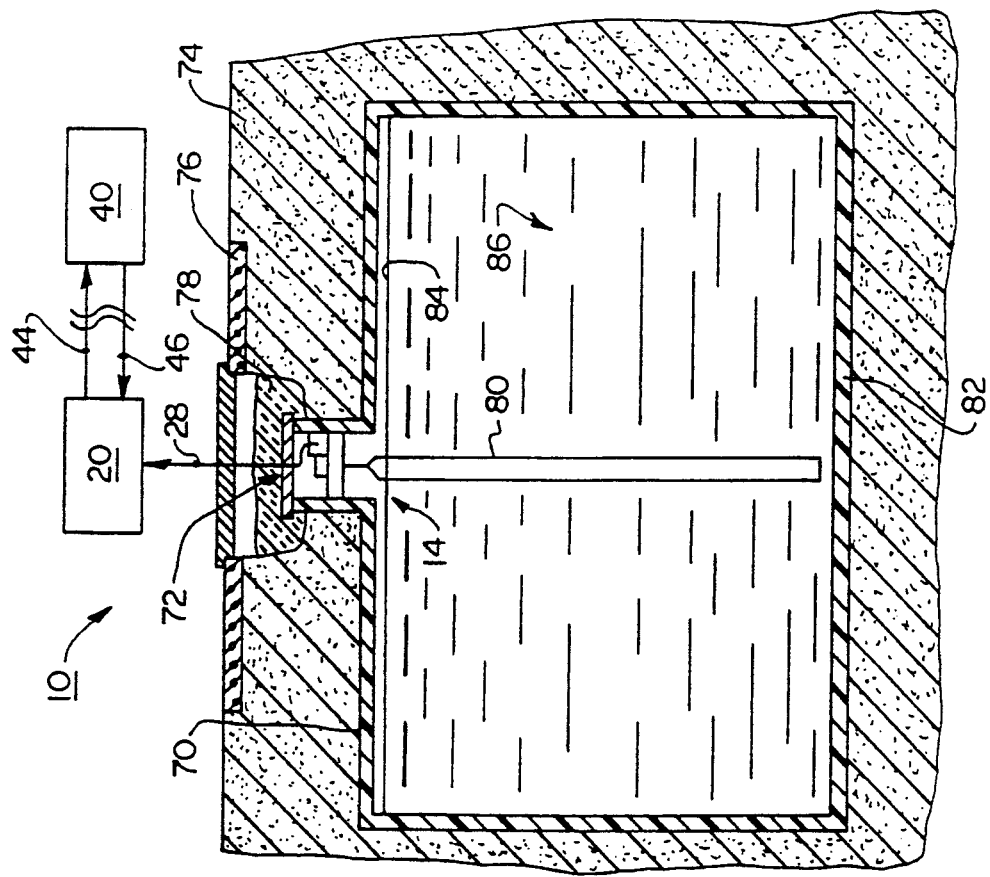
FIG. 2 is a vertical sectional view of the tank monitor shown in FIG. 1, the view being generally diagrammatic.

Tank monitor 12 includes a sensor assembly 14 for each tank (see FIG. 2). Sensor assembly 14 provides an output signal 18 which is representative of the fluid mass in the tank. An A/D (analog to digital) converter 16 is located adjacent to and is maintained at substantially the same temperature as the sensor assembly 14.

As will be discussed in more detail later, the present invention is based, in part, upon the discovery that a significant source of error in the fluid mass 35 measurement can be due to thermoelectric effects which add small voltages to a sensor's analog output signal. Thermoelectric effects can easily cause temperature induced errors in excess of the required system resolution of 0.05 gallons per hour. By converting the sensor output to a digital signal 28 prior to the signal leaving the almost constant temperature environment of the tank, subsequent signal degradation can be avoided. As a result, a significant increase in resolution of the output 28 from sensor assembly 14 is obtained when compared to its analog-based counterpart.

Output 28 from the tank monitor system 12 is received by a local polling system 20. Local polling system 20 includes a microprocessor-based CPU 22. A clock 24 provides a control signal 26 to the CPU 22 at predetermined intervals. Upon receiving clock signal 26, the CPU 22 polls each input 28 corresponding to a plurality of tank monitors 12 and stores these values in local memory 30 via input 32. The data from each tank monitor is generally stored in a "date, time, tank identification number, and sensor assembly output value" format. In one preferred embodiment, the recorded amounts from a plurality of individual dispensers 29 connected to each tank are also stored in local memory 30. Output 34 allows local CPU 22 to interrogate local memory 30. Alternatively, local polling system 20 may also be configured with a keyboard or other input device for this data.

Local polling system 20 is, in turn, connected to remote polling system 40. Remote polling system 40 includes a remote microprocessor-based CPU 42 which is adapted to receive a plurality of inputs 44 each corresponding to a local polling system 20. In addition, remote CPU 42 is adapted to provide a plurality of outputs 46 to enable the remote polling system 40 to poll each local polling system 20 and receive the contents of the local memory 30 corresponding to the collected data from each tank monitor 12. Remote polling system 40 includes a keyboard/clock 50 which provides a control system signal 52 to initiate the polling sequence.

Remote memory 54 includes a look-up table corresponding to the initial calibration for each tank monitor system 12. Memory input 56 permits additional data to be stored by CPU 42 in remote memory 54. Memory output 58 permits CPU 42 to interrogate memory 54 and to utilize this collected data along with the input 44 from each local polling system. Keyboard 50 may be utilized to input known tank deliveries and sales from each tank, thereby allowing local polling system 20 to operate without any local operator input. Alternatively, local polling system 20 may also be configured with a keyboard or other input device for entering the recorded amounts from the plurality of individual dispensers 29 connected to each tank. The output from remote local CPU 42 is provided along line 60 to disk storage means 62, video display 64 and printer 66.

Turning now to FIG. 2, there is shown a vertical section view of the tank leak and inventory control system 10 shown in FIG. 1, the view being generally diagrammatic. A conventional, cylindrical underground tank 70 includes one or more tank access ports 72. The remainder of the tank is buried under several feet of earth 74. In addition, a cover 76 of concrete or asphalt usually covers the area surrounding the tank 70.

Tank monitor 12 includes a displacer 80. In one embodiment, displacer 80 is a thin wall stainless steel cylinder having a diameter of approximately 2-⅜ inches to permit it to pass through access port 72. In the preferred embodiment, the displacer 80 has a generally uniform and circular cross-section. The length of the displacer is varied between 6 and 12 feet depending on the diameter of tank 70. The nominal weight of displacer 80 is approximately 14 lbs for an eight foot diameter tank. In one preferred embodiment, the upper end of the displacer is tapered to shed droplets of water which may condense from vapor in the tank. Also, as will be discussed in more detail, in an alternative embodiment the cross-section of displacer 80 is varied proportionally to the cross-section of the underground tank 70. In the preferred embodiment, displacer 80 is sufficiently long to extend down nearly to the bottom 82 of underground tank 70 and extends above the maximum fluid level 84 within the tank.

Figure 3:
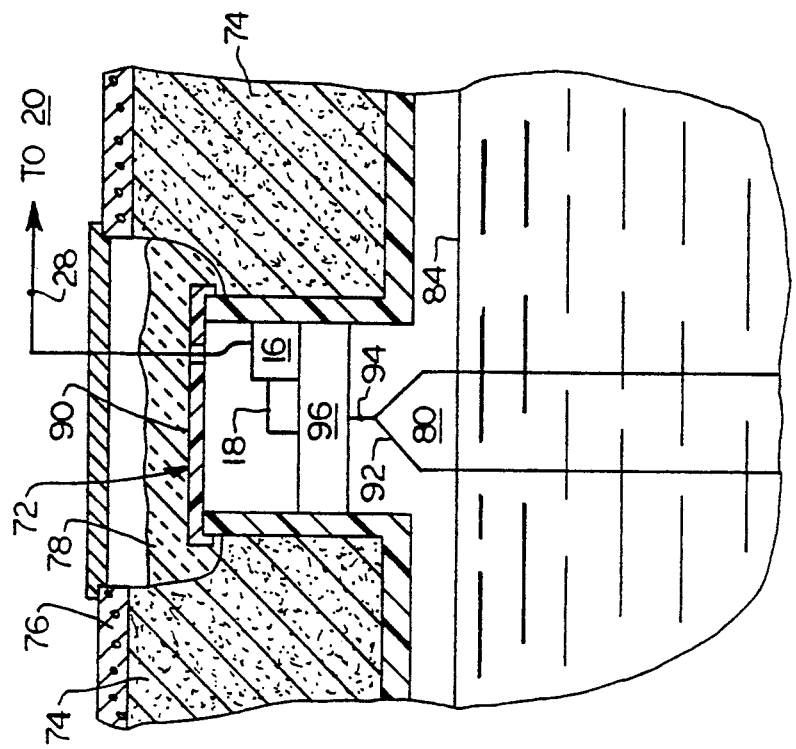
FIG. 3 is an enlarged vertical cross-sectional view of the tank, monitor shown in FIG. 2.

As best seen in FIG. 3, an enlarged vertical sectional view of the sensor assembly 14 of the tank monitor 12 shown in FIG. 2, is illustrated. A cap 90 seals the top of access port 72. Cap 90 may be covered by one or more layers of insulation 78 to help insure that the sensor assembly 14 is maintained at essentially the same temperature as the fluid within the tank 70. As discussed above, displacer 80 has a cone/pyramid shaped portion 92 which sheds water droplets which may condense onto the upper surface of the displacer 80. A wire rope 94 is attached at one end to the upper portion 92 of displacer 80 and at the other end to a load cell assembly 96. As discussed above, A/D converter 16 is located adjacent to sensor assembly 14 and is maintained at substantially the same temperature as sensor assembly 14, thereby minimizing temperature induced errors that would normally occur in an analog-based system. For flammable fluids where safety is a concern, it may be required by regulations to locate A/D converter 16 outside of access port 72. In such a case, appropriate care would be necessary minimize temperature effects.

Figure 4:
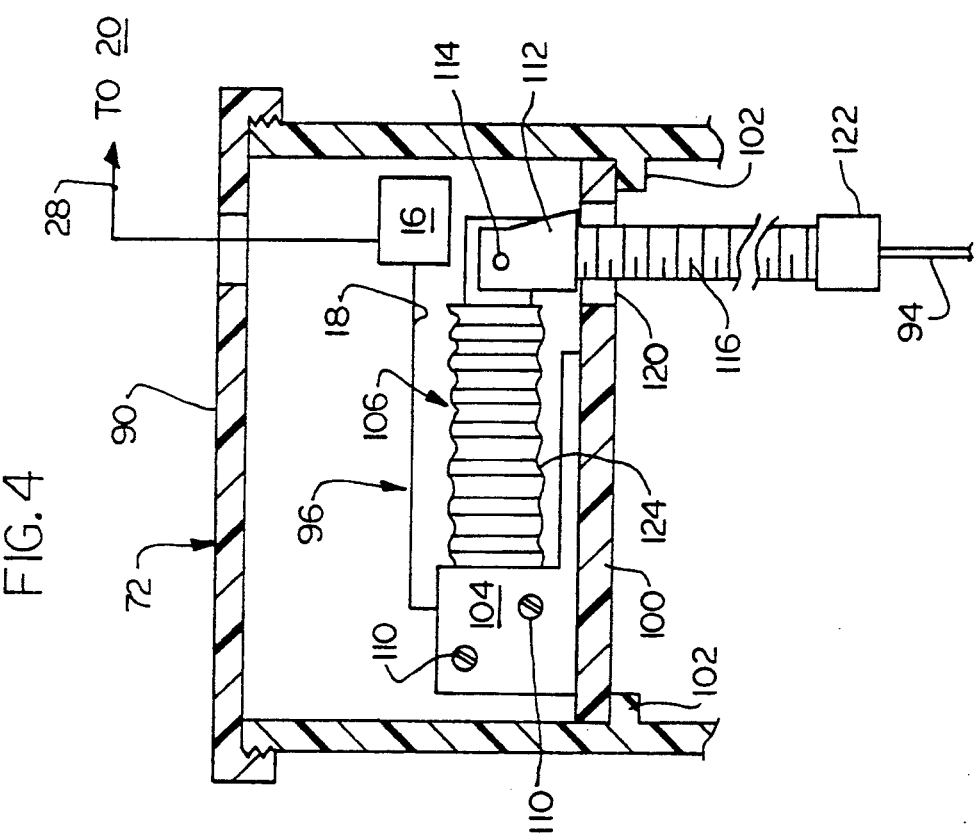
FIG. 4 is a further enlarged vertical cross-sectional view of the sensor assembly of the tank monitor shown in FIG. 3.

Turning now to FIG. 4, there is shown an enlarged vertical section view of the load cell assembly 96 shown in FIG. 3. Load cell assembly 96 includes a circular mounting plate 100 which is supported by support lips 102 attached to the inside diameter of access port 72. An L-shaped bracket 104 is attached to the upper surface of mounting plate 100. A load cell 106 is attached to the L-shaped bracket 104 at one end by screws/fastener 110. A saddle hanger 112 is attached to the other end of load cell 106 by means of pivot pin 114.

Load cell 106 is sized according to the weight of displacer 80. In the preferred embodiment, a displacer 80 having a weight of approximately 14 lbs and a load cell having a capacity of 100 newtons (approximately 22 lbs.) is used. Load cell 106 is hermetically sealed to prevent vapors present in the tank from entering and degrading the strain gages (not shown) of the cell. In the preferred embodiment, sealing is facilitated by a metal bellows 124.

Any of a number of conventional load cells can be used. However, one load cell which has proved particularly satisfactory is an Alpha Load Beam available from BLH Electronics, Canton, Mass.

A threaded rod 116 is attached at one end to saddle hanger 112 and at the other end to adapter 122. Adapter 122, in turn, is connected to wire rope 94 which suspends displacer 80. An aperture 120 in mounting plate 100 permits the threaded rod to extend therethrough.

The output from sensor assembly 14 would be expected to be independent of fluid temperature since the buoyancy principle on which the sensor is based, measures mass, which is temperature independent, rather than the volume of the fluid in tank 70, which is temperature dependent. Accordingly, the output 18 of sensor assembly 14 should be constant for a constant mass in tank 70. However, this is not the case.

First, the output 18 of load cell 106 is not completely insensitive to temperature. Load cells are available having output signals which are minimally sensitive to the ambient temperature of the load cell. By locating such a load cell in access port 72 of tank 70, advantage is taken of the relatively constant temperature environment of tank 70 due to the proximity of the large mass of fluid in combination with the insulating benefit of the surrounding earth 74.

Second, thermal gradients which arise across dissimilar metal junctions in load cell 106, A/D converter 16, and their connecting wiring are a source of temperature induced errors. These thermoelectric effects are minimized when A/D convertor 16 is located in the relatively constant temperature environment of tank 70. Alternatively, a load cell having an inherently digital output signal can be used.

Finally, another source of temperature related error is inherent in the geometry of tank 70 and displacer 80. Consider a simple cylindrical tank 70, laid horizontally, with a cylindrical displacer 80 extending substantially to the bottom 82 of tank 70, such as shown in FIG. 2. The source of the measurement error can best be understood as follows:

If we assume the tank and displacer have a negligible thermal expansion coefficient (i.e., these dimensions remain relatively constant over the temperature range of interest), the volumetric thermal expansion coefficient of gasoline is approximately 0.0008 per degree F, and one gallon = 231 in$^3$ and for an 8000 gallon capacity, cylindrical tank:

Length (L) = 256 inches
Radius (R) = 48 inches
Area $(A) = R^2 \cos^{-1}((R - h)/R) - (R - h)(2Rh - h^2)^{\frac{1}{2}}$ (1)
Volume $(V) = AL$ (2)
Gallons $(G) = AL/231$ (3)

Then at a fixed temperature and any level for a displacer with a constant cross-section according to the buoyancy principle:

$$G = KF = K'ph \quad (4)$$

where
$F$ = measured force on displacer
$K, K'$ = constants (over small height changes)
$p$ = density
$h$ = tank level Accordingly, for a 1 degree F. temperature change:

$\Delta G = K'p\Delta h + K'h\Delta p$ (5)
$\Delta G/G = \Delta h/h + \Delta p/p$ (6)
$\Delta G = (\Delta h/h + \Delta p/p)G$ (7)

where $\Delta G$ is the change in measured gallons per 1 degree F. change. For a fully compensated measurement $\Delta G = 0$.

Eq.(7) is solved as follows for any level h:

$\Delta A/A = \Delta V/V = -\Delta p/p = 0.0008$ (8)
$\Delta A = 0.0008 A$ (9)
$A_1 = A_0 + \Delta A = .0008 A_0$ (10)

$A_0$ is determined by Eq.(1)
$A_1$ is determined by Eq.(10)
$h_1$ is determined by iterative solution of Eq.(1)

$\Delta h = h_1 - h$ (11)

G is given by Eq.(3)

Substituting $\Delta h$, $h$, $\Delta p/p$ and G into Eq.(7) and solving for $\Delta G$ as a function of h yields the result illustrated by FIG. 5. The vertical axis of FIG. 5 is in temperature corrected gallons.

As can be seen in FIG. 5, the error remains at less than one gallon over substantially the entire operating range of the sensor assembly. Since the rate of fluid temperature change is normally less that 0.01 degrees F. per hour, the contribution from this error will be less than 0.01 gallons per hour. This value is well under the 0.05 gallons per hour currently established for leak detection. If leak detection is necessary over the entire operating range, i.e. > 95% of tank capacity, the displacer 80 may be modified to allow this source of error to be substantially eliminated. This can best be understood as follows: Consider the general case of a storage tank of any shape, partially filled with fluid:

$V_T$ = volume of fluid in the tank
$p$ = density of the fluid
$m_T$ = mass of fluid in the tank
then
$m_T = pV_T$ (12)

Suppose the temperature of the fluid changes; then p and $V_T$ will change but $m_T$ will not, therefore:

$dm_T = V_T dp + p dV_T = 0$ (13)
$V_T dp = -p dV_T$ (14)
$dV_T/V_T = -dp/p$ (15)

Now suppose the tank has a displacer suspended in it such that the volume of fluid displaced is $V_D$, then:

$m_D = V_D p$ (16)

$F = gm_D$ (17)

where $F$ = buoyant force on displacer
$V_D$ = volume displaced
$p$ = density of the fluid
$m_D$ = mass of the fluid displaced
$g$ = gravitational constant In the general case, for a change in fluid temperature, there will be a change in fluid level and both $V_D$ and p will change:

$dF = g dm_d$ (18)

$dm_D = dV_D p + V_D dp$ (19)

For a displacer design where the buoyancy force does not change for a change in fluid temperature (T):

$dm_D/dT = 0$ (20)

substituting from Eq.(19)

$dV_D p + V_D dp = 0$ (21)

or $dV_D/V_D = -dp/p$ (22)

combining Eq.(15) and Eq.(22)

$dV_D/V_D = dV_T/V_T$ (23)

Eq.(23) can be further solved for $V_D$ in terms of $V_T$ $V_D = kV_T$ (24)

Thus, in order for the buoyancy force from a displacer to be independent of the fluid temperature, the displacer must "match" the tank. Accordingly, for the special case of a horizontally laid, cylindrical tank, it can be shown the cross-sectional area of the displacer at any given fluid level must be proportional to the length of the chord across the tank at that fluid level. A graphical representation of this relationship is shown in FIG. 6.

Finally, Eq.(24) can be used to show that the volume of fluid displaced at any height h must be directly proportional to the volume held by the tank at that particular h. This means that the displacer must extend lower than the minimum value of h expected in actual use and that the relation described by Eq.(24) must be followed even for the minimum h. Accordingly, when fluid stratification effects are taken into account, it will be seen that the ideal displacer design should maintain the relation described by Eq.(24) substantially to the bottom of tank 70.

Figure 8:
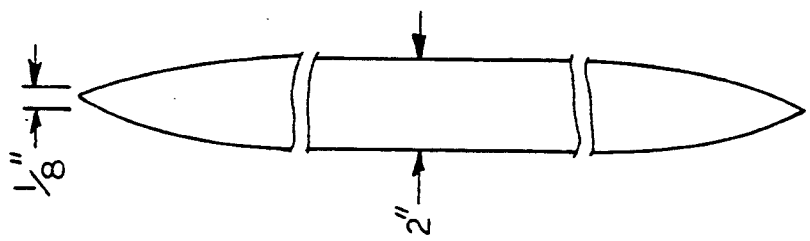
FIG. 8 is a side elevational view of the displacer shown in FIG. 7, taken along lines 8—8.
Figure 7:
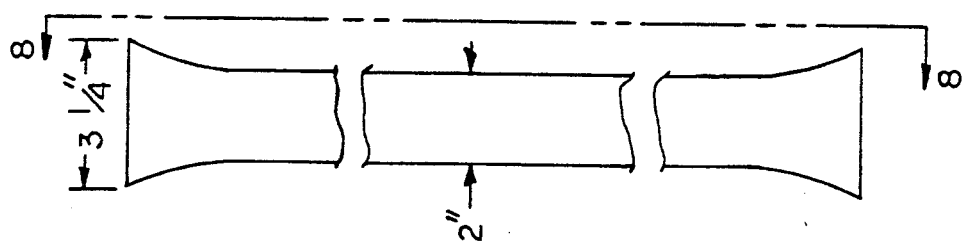
FIG. 7 is a front elevational view of a preferred displacer for a tank monitor constructed according to the present invention.

For a thin wall stainless steel displacer having a diameter of 2-⅜ inches and a length of approximately 8 feet, this profile can be approximated by flattening each end of the displacer and welding the ends shut. The "line" formed by the weld corresponds approximately to the zero value of the width shown in FIG. 6 and the effective width of the displacer increases to a maximum of two inches at its center. An example of such a displacer is shown in FIGS. 7 and 8. It becomes readily apparent that other geometries of displacers could function similarly.

Figure 9:
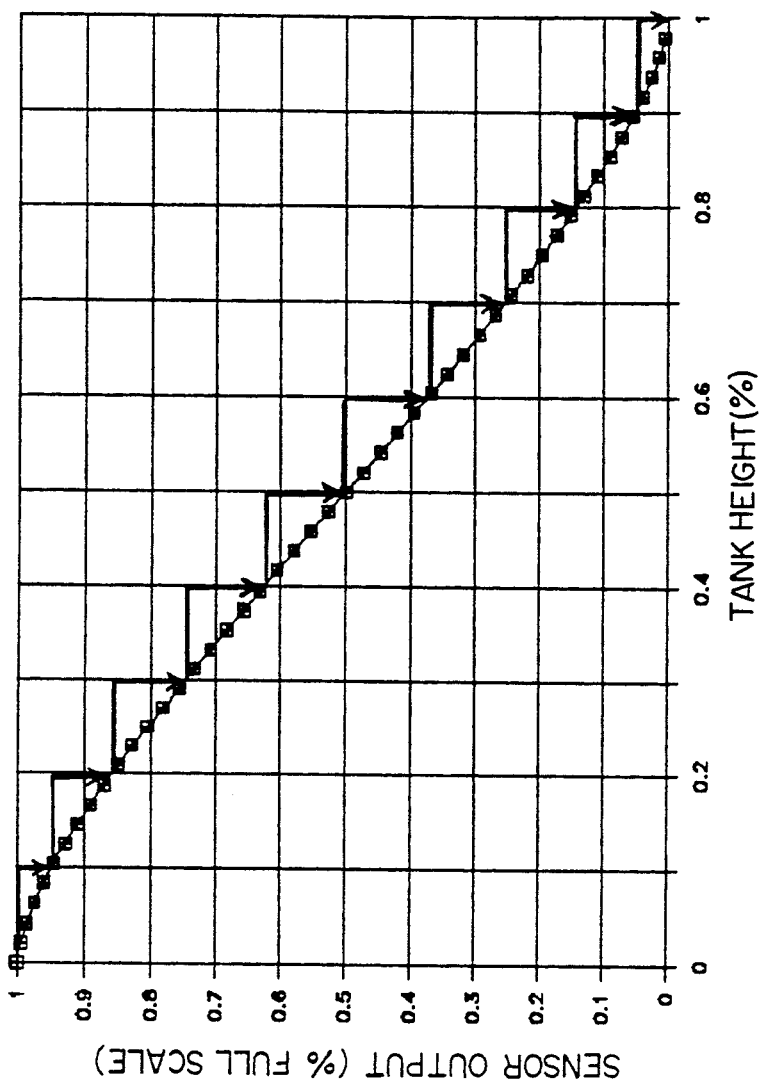
FIG. 9 is a graphical representation of the measured output of a tank monitor constructed according to the present invention over a changing volume level for a horizontally laid, cylindrical cross-section tank.

Finally, turning to FIG. 9, there is shown a graphical representation of the output of a tank monitor 12, constructed according to the present invention, and illustrating how the tank monitor 12 is calibrated initially. In an ideal world this procedure would not be necessary. However, in the real world each tank is a one-of-a-kind. Thus, a look-up table corresponding to each tank 70 may be necessary to meet the accuracy requirements of inventory reconciliation. However, this degree of accuracy would not be necessary to meet present EPA leak detection requirements.

In operation, displacer 80 is first suspended in tank 70 by means of wire rope 94 attached at one end to the upper portion 92 of displacer 80 and at the other end to a threaded rod connected to load cell assembly 96. Displacer 80 has a cone/pyramid shaped portion 92 which sheds condensed water vapor. Load cell assembly 96 measures the buoyancy force exerted on displacer 80 and provides signal 18, representative of this force, to A/D converter. As discussed above, A/D converter 16 is located adjacent to sensor assembly 14 and is maintained at substantially the same temperature as sensor assembly 14, thereby minimizing temperature induced errors that occur in an analog-based system.

The output 28 from the tank monitor system 12 is received by local polling system 20. Clock 24 provides a control signal 26 to CPU 22 at predetermined intervals. Upon receiving clock signal 26, the CPU 22 polls each input 28 corresponding to each tank monitor 12 and stores these values in local memory 30 via input 32 in a "date, time, tank identification number, and sensor assembly output value" format.

Remote polling system 40, in turn, receives inputs 44 corresponding to each local polling system 20. In addition, remote CPU 42 provides output 46 to enable the remote polling system 40 to poll each local polling system 20 and receive the contents of the local memory 30 corresponding to the collected data from each tank monitor 12. Keyboard/clock 50 provides a control system signal 52 to initiate the polling sequence.

Tank 70 is first pumped nearly empty but not below the bottom of displacer 80. The output from tank monitor 12 is then recorded. This value is substantially equal to the "dead weight" of the displacer and represents "zero" fluid mass. A finite quantity of fluid mass is then added to tank 70 and the output from tank monitor 12 is again recorded. This procedure is repeated again and again until tank 70 is full or a level greater than will actually be used in practice is reached. The look-up table corresponding to the initial calibration for each tank monitor system 12 is stored in memory 54.

Keyboard 50 may be used to input known tank deliveries and sales from each tank, thereby allowing the local polling system 20 to operate without any local operator input. Alternatively, the local polling system 20 may also be configured with a keyboard or other input device for entering the recorded amounts from the plurality of individual dispensers 29 connected to each tank.

CPU 42 interrogates memory 54 and utilizes this collected data, along with the input 44 from each local polling system, to calculate the actual fluid mass for each tank 70. The output from remote CPU 42 is provided along line 60 to disk storage means 62, video display 64 and printer 66.

Certain modifications and improvements will occur to those skilled in the art upon reading of the foregoing description. By way of example, a load cell which produces a digital output directly would eliminate the need for a separate A/D converter. Also the tank calibration look-up tables could be stored at the local site. It should be understood that all such modifications and improvements have been deleted herein for the sake of conciseness and readability but are properly within the scope of the following claims.

We claim:

1. A sensor assembly for a monitoring system for a storage tank containing a fluid, said sensor assembly comprising:
    (a) a body positioned within said tank and extending into the fluid contained by said tank;
    (b) sensor means for sensing the force exerted by said fluid upon said body and providing a first signal representative of said force; and
    (c) means mounted within said tank adjacent to said sensor means for receiving said first signal and providing a second signal, said second signal being digitally encoded, whereby said means is maintained at substantially the same temperature as said sensor means and the fluid in said tank, thereby eliminating measurement errors, for example the Seebeck Effect, which occur due to differences in temperature between said sensor means, the fluid in said tank, and said means mounted within said tank.

2. The apparatus according to claim 1, wherein said body adapted to be positioned within said tank and extending into the fluid contained by said tank is attached to said sensor means at one end and the other end is freely suspended in said fluid.

3. The apparatus according to claim 1, wherein said sensor means for sensing the force exerted by said fluid upon said body and providing a first signal representative of said force is a load cell.

4. The apparatus according to claim 1, wherein said means mounted within said tank adjacent to said sensor means for receiving said first signal and providing a second signal, said second signal being digitally encoded, is an A/D converter.

5. A monitoring system for a storage tank containing a fluid, said system comprising:
    (a) a body positioned within said tank and extending into the fluid contained by said tank;

(b) sensor means for sensing the force exerted by said fluid upon said body and providing a first signal representative of said force;

(c) means mounted within said tank adjacent to said sensor means for receiving said first signal and providing a second signal, said second signal being digitally encoded, whereby said means is maintained at substantially the same temperature as said sensor means and the fluid in said tank, thereby eliminating measurement errors, for example the Seebeck Effect, which occur due to differences in temperature between said sensor means, the fluid in said tank, and said means mounted within said tank; and (d) first storage means for storing a plurality of first values in a look-up table, each of said first values corresponding to a periodic entry of the force exerted by said fluid upon said body during initial filling of said tank, said first values defining a relationship between the force exerted upon said body at a given fluid depth in said tank and the corresponding fluid mass within said tank, said first values being based on the unique characteristics of said tank, said characteristics including tank shape, volume, orientation, location of said sensor means, and the shape of said body.

6. The apparatus according to claim 5, further including means for computing a second value representative of the fluid mass within said tank by comparing a subsequent signal representative of the force on said body with said plurality of first values in said look-up table and providing its corresponding fluid mass.

7. The apparatus according to claim 6, further including second means for storage of said second values representative of the fluid mass within said tank over a predetermined time interval.

8. The apparatus according to claim 7, further including means for detecting a change in fluid mass in said tank by comparing said second values over said predetermined time interval.

9. The monitoring system according to claim 7, further including third storage means for storing a plurality of third values, each of said third values corresponding to a periodic entry of the force exerted by said fluid upon said body at a predetermined time interval.

10. The apparatus according to claim 9, wherein said third storage means is connected between said sensor means and said means for computing said second value representative of the fluid mass within said tank, said third storage means supplying said third values to said means for computing in response to a control signal from said means for computing.

11. The apparatus according to claim 10, wherein said third storage means is located at said tank.

12. The apparatus according to claim 5, wherein said first storage means is remotely located from said tank.

13. The apparatus according to claim 5, wherein said body is attached to said sensor means at one end and the other end is freely suspended in said fluid.

14. The apparatus according to claim 13, wherein said body includes a generally elongated, cylindrically-shaped portion and at least one end portion shaped along its length proportionally to the horizontal cross-sectional area of said tank.

15. The apparatus according to claim 14, wherein said at least one end portion is the upper end of said body.

16. The apparatus according to claim 15, wherein said at least one end portion further includes the lower end of said body.

17. The apparatus according to claim 5, wherein said body extending into the fluid contained by said tank extends into the fluid at least to the lowest fluid level in said tank.

18. The apparatus according to claim 5, wherein said body extending into the fluid contained by said tank extends substantially to the bottom of said tank.

19. The apparatus according to claim 5, wherein said sensor means for sensing the force exerted by said fluid upon said body and providing a first signal representative of said force is a load cell.

20. The apparatus according to claim 5, wherein said means mounted within said tank adjacent to said sensor means for receiving said first signal and providing a second signal, said second signal being digitally encoded, is an A/D converter.

21. A method for sensing the fluid mass in a storage tank containing a fluid, said method including the steps of:

(a) extending a body into the fluid contained by said tank;

(b) sensing the force exerted by said fluid upon said body and providing a first signal representative of said force; and (c) receiving said first signal and providing a second signal, said second signal being digitally encoded, thereby eliminating measurement errors, for example the Seebeck Effect, which occur due to differences in temperature between the sensor, the fluid in the tank, and the processing circuitry mounted within the tank.

22. A method for monitoring a storage tank containing a fluid, said method including the steps of:

(a) extending a body into the fluid contained by said tank;

(b) sensing the force exerted by said fluid upon said body and providing a signal representative of said force;

(c) providing a second signal, said second signal being digitally encoded, thereby eliminating measurement errors, for example the Seebeck Effect, which occur due to differences in temperature between the sensor, the fluid in the tank, and the processing circuitry mounted within the tank;

(d) storing a plurality of first values in a lock-up table, each of said first values corresponding to a periodic entry of the force exerted by said fluid upon said body during initial filling of said tank, said first values defining a relationship between the force exerted upon said body at a given fluid depth in said tank and the corresponding fluid mass within said tank, said first values being based on the unique characteristics of said tank, said characteristics including tank shape, volume, orientation, location of said sensor means, and the shape of said body; and (e) computing a second value representative of the fluid mass within said tank by comparing a subsequent signal representative of the force on said body with said plurality of first values in said look-up table and providing its corresponding fluid mass.

* * * * *